United States Patent Office 3,708,553
Patented Jan. 2, 1973

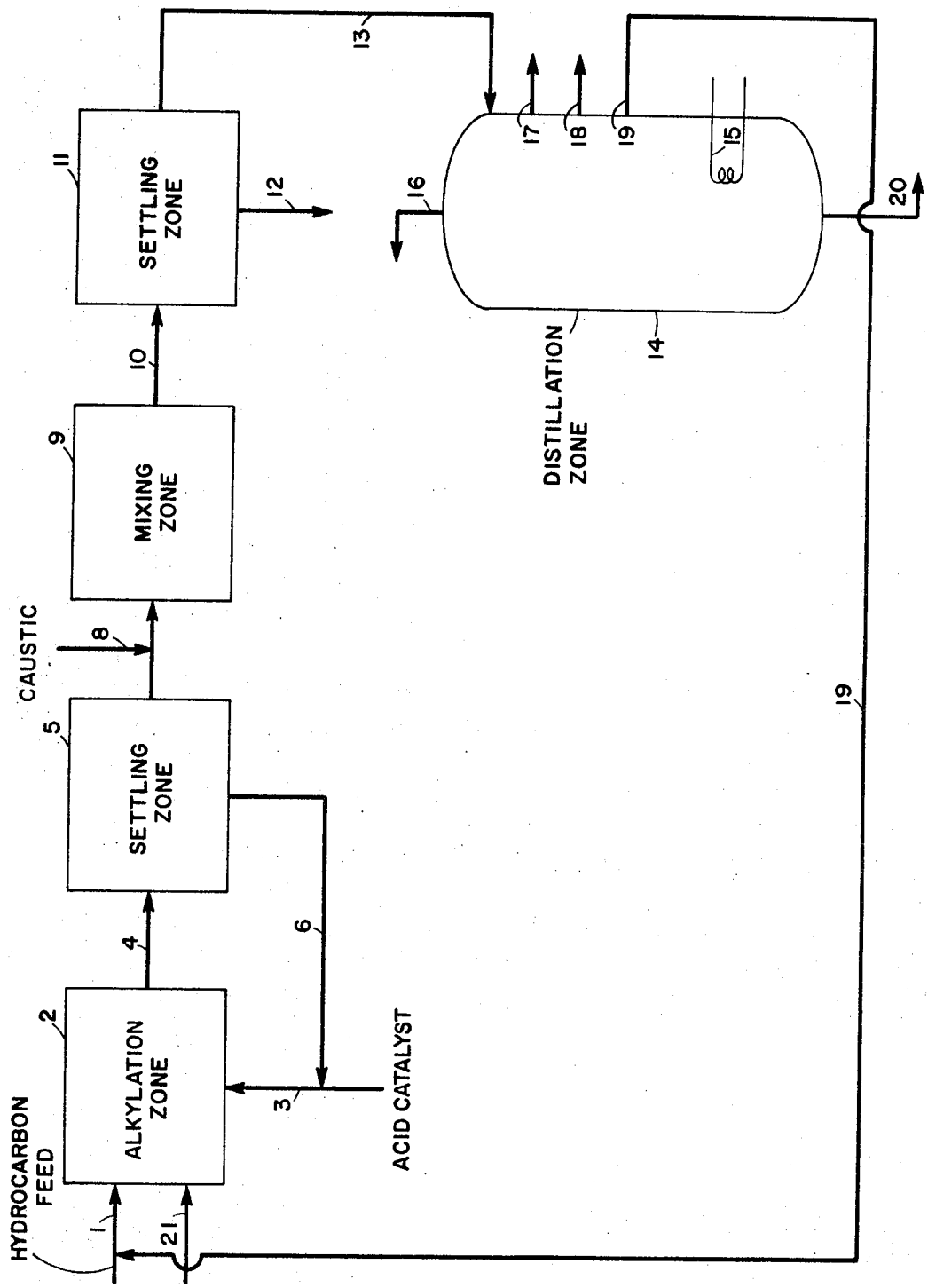

3,708,553
ALKYLATION PROCESS UTILIZING A LEWIS ACID HALIDE WITH FLUOROSULFURIC OR TRIFLUOROMETHANESULFONIC ACID
George A. Olah, Cleveland, Ohio, assignor to Esso Research and Engineering Company
Filed June 25, 1971, Ser. No. 156,884
Int. Cl. C07c 3/54
U.S. Cl. 260—683.47                      14 Claims

ABSTRACT OF THE DISCLOSURE

High octane alkylates are prepared by contacting paraffinic and/or alkyl substituted aromatic hydrocarbons with olefins at alkylation conditions in the presence of a catalyst comprising (a) a Lewis acid of the formula $MX_n$ where M is selected from the Group IV-B, V or VI-B elements of the Periodic Table, X is a halogen, and $n$ varies from 3-6, and (b) a strong Bronsted acid selected from the group comprising fluorosulfuric acid and trifluoromethanesulfonic acid and mixtures thereof.

BACKGROUND OF THE INVENTION

The present invention relates to a process for the alkylation of paraffinic and/or alkyl substituted aromatic hydrocarbons with olefins in the presence of a catalyst comprising (a) a Lewis acid of the formula $MX_n$ where M is selected from Group IV-B, Group V or Group VI-B elements of the Periodic Table, X is a halogen, preferably fluorine, and $n$ varies from 3-6, and (b) a strong Bronsted acid selected from the group consisting of fluorosulfuric acid and trifluoromethanesulfonic acid.

DESCRIPTION OF THE PRIOR ART

The acid catalyzed addition of an alkane to an alkene is well known. Generally, the catalytic alkylation of paraffins involves the addition of an alkyl cation derived from an isoparaffin containing a tertiary hydrogen to an olefin. The process is used by the petroleum industry to prepare highly branched $C_6$-$C_9$ paraffins that are high quality fuels for ignition engines. The process conditions required and the product composition depend on the particular hydrocarbons involved in the reaction.

The most important rate-determining factor in the alkylation reaction is the hydride extraction step, i.e. the removal of H⁻ from the paraffin to form an alkyl cation. In the case of isoparaffins, such as isobutane, the conversion to the cation is rapid at low temperatures, e.g. −1 to 16° C. However, in the case of normal paraffins such as normal butane, the formation of the alkyl cation, with the generally known catalyst systems, is very slow at ordinary alkylation temperatures.

Ionization of the normal paraffins at higher temperatures is not feasible as the alkylation reaction produces large quantities of undesirable high and low molecular weight hydrocarbon products. It has now been found that these problems can be circumvented by use of the special acid catalyst systems of this invention.

SUMMARY OF THE INVENTION

In accordance with the invention, alkylatable hydrocarbons selected from the group consisting of paraffins, alkyl substituted aromatic compounds and mixtures thereof, are alkylated with olefins at alkylation conditions in the presence of a catalyst comprising (a) one or more Lewis acids of the formula $MX_n$ where M is selected from the Group IV-B, V or VI-B elements of the Periodic Table, X is a halogen, preferably fluorine, and $n$ varies from 3-6, and (b) a strong Bronsted acid, preferably comprising a fluoroacid such as fluorosulfuric acid, trifluoromethanesulfonic acid, or mixtures thereof, at reaction temperatures in the range of −40° to +40° C. Suitable Group IV-B, V or VI-B elements include titanium, vanadium, zirconium, niobium, phosphorus, tantalum, molybdenum, chromium, tungsten, arsenic, antimony, bismuth and the like. The Periodic Table referred to is that described in "The Encyclopedia of Chemistry," Reinhold Publishing Corporation, 2nd ed. (1966) at page 790. The term "elements" as used herein refers to the metals and metalloids of the aforementioned groups of the Periodic Table.

Groups IV-B, V-B, and VI metal fluorides are preferred Lewis acids. Specific examples of useful metal fluorides include antimony pentafluoride, tantalum pentafluoride, niobium pentafluoride, vandium pentafluoride, titanium tetrafluoride, molybdenum hexafluoride, bismuth pentafluoride, phosphorus pentafluoride, arsenic pentafluoride, mixtures thereof and the like. Moreover, chlorine, bromine or iodine may be substituted for fluorine without affecting the efficiency of the catalyst.

The nature of the Bronsted acid is quite important since it has been found that acids such as trifluoroacetic acid are not effective co-catalysts under the conditions of the alkylations.

Preferably, the catalyst is composed of only one Lewis acid and one Bronsted acid. Exemplary of such catalyst compositions that are encompassed by this invention are the following:

Catalyst
  No.:
    1—antimony pentafluoride-fluorosulfuric acid
    2—arsenic pentafluoride-fluorosulfuric acid
    3—tantalum pentafluoride-fluorosulfuric acid
    4—niobium pentafluoride-fluorosulfuric acid
    5—vanadium pentafluoride-fluorosulfuric acid
    6—titanium tetrafluoride-fluorosulfuric acid
    7—molybdenum hexafluoride-fluorosulfuric acid
    8—antimony pentafluoride-chlorosulfuric acid
    9—antimony pentafluoride-trifluoromethanesulfonic acid
    10—arsenic pentafluoride-trifluoromethanesulfonic acid
    11—tantalum pentafluoride-trifluoromethanesulfonic acid
    12—niobium pentafluoride-trifluoromethanesulfonic acid
    13—vanadium pentafluoride-trifluoromethanesulfonic acid
    14—titanium tetrafluoride-trifluoromethanesulfonic acid
    15—molybdenum hexafluoride-trifluoromethanesulfonic acid
    16—zirconium tetrafluoride-trifluoromethanesulfonic acid Generally, the catalyst comprises 1 to 20 or more moles of the Bronsted acid to 1 mole of the Lewis acid. Preferably, the molar ratio of Bronsted to Lewis acid ranges from 5:1 to 1:1.

The amount of catalyst contacted with the reactants catalyst composition per part by weight of the olefin present in the reaction mixture. Preferably, the amount of catalyst present will range from 1 to 10 parts by weight per part by weight of the olefin present.

The catalyst may be used as the neat liquid, as a diluted solution or as a solid, such as adsorbed on a solid support. With regard to the use of the catalyst in solution, any diluent may be used that is inert to the catalyst under the reaction conditions. To obtain optimum results, the diluents should be pretreated to remove catalyst poisons such as water, etc. Typical diluents include sulfuryl chloride fluoride, sulfuryl fluoride, fluorinated hydrocarbons, mixtures thereof and the like. The diluent:catalyst volume ratio can range from about 20:1 to 1:1. Higher dilutions may be desirable, for instance, in those reactions that proceed with high exothermicity.

The catalyst system may be employed incorporated with a suitable solid carrier or support. Any solid catalyst support may be used that is inert to the catalyst under the reaction conditions. The support should be pretreated, such as by heating, chemical treatment or coating to remove substantially all water and/or hydroxylic sites that might be present. Active supports may be rendered inert by coating them with an inert material such as antimony trifluoride or aluminum trifluoride. Suitable solid supports include fluoride-treated or coated resins such as sulfonated cation exchange resins, fluoride-treated acidic chalcites such as alumina and aluminosilicates and acid-resistant molecular sieves such as faujasite and zeolite.

The supported catalyst can be prepared in any suitable manner, such as by conventional methods including dry mixing, coprecipitation or impregnation. In one embodiment, the supported catalyst is prepared by impregnating a suitable deactivated support with a Lewis acid such as antimony pentafluoride and then with a Bronsted acid such as fluorosulfuric acid. The weight ratio of the Lewis acid and Bronsted acid to the support can range from 1:100 to 1:10.

Olefinic starting materials such as ethylene, propylene, n-butenes, isobutene, trimethyl ethylene, the isomeric pentenes and similar higher monoolefinic hydrocarbons of either a straight chain or branched chain structure are suitable for use in the present reaction. Olefins containing 2 to 12 carbon atoms per molecule are preferred while olefins containing 2 to 5 carbon atoms per molecule are particularly preferred. The reaction mixtures may also contain some amounts of diolefins. Although it is desirable from an economic viewpoint to use the normally gaseous olefins as reactants, normally liquid olefins may also be used. Thus the invention contemplates the use of polymers, copolymers, interpolymers, crosspolymers, etc., of the above-mentioned olefins, as for example, the diisobutylene and triisobutylene polymers, the codimer of normal butylenes and the like. The use of mixtures of two or more of the above described is also envisioned for use in this process. The process is particularly suited for use in refinery alkylation processes and contemplates the use of various refinery cuts as feedstocks.

Hydrocarbon feedstocks that are suitable for use in the subject process include paraffins, alkyl substituted aromatic hydrocarbons and mixtures thereof. The paraffins as herein defined include the aliphatic and cycloaliphatic hydrocarbons. The aliphatic hydrocarbons (straight and branched chain materials) contain 1 to 12 carbon atoms per molecule, preferably 4-8 carbon atoms, and may be exemplified by n-butane, n-pentane, methylpentane, methylhexane, and the like. It is noted that formerly "unreactive" alkanes such as methane and ethane are now alkylatable by use of the acid catalysts of this invention. The cycloaliphatic hydrocarbons (naphthenes) contain 6 to 15 carbon atoms per molecule, preferably 6 to 12 carbon atoms, and may be exemplified by methylcyclopentane, dimethylcyclopentane, ethylcyclohexane, n-pentylcyclohexane and the like. Useful alkyl aromatic hydrocarbons contain 7 to 20 carbon atoms per molecule and are exemplified by ethyl benzene, n-butyl benzene and the like. Other aliphatic or alicyclic hydrocarbons commonly found in conventional petroleum hydrocarbon light naphtha streams and the like may be present.

The molar ratio of olefin to hydrocarbon in the reaction zone may range from 1:1 to 1:500, and preferably from 1:10 to 1:100. In general a high dilution of the olefin is preferred in order to prevent competitive side reactions such as self-condensation.

The feed may also contain various cracking inhibitors or moderators such as hydrogen. The inhibitors act to depress excessive cleavage reactions that may occur during the alkylation. Hydrogen is the preferred moderator and is used in amounts ranging from about 1 to 3 mole percent or more based on hydrocarbon feed.

The process catalyst system is somewhat sensitive to impurities such as water and therefore the alkylation should be conducted substantially in the absence of large amounts of moisture, i.e. by the use of anhydrous reagents, by purification of the starting reagents, etc.

The process of the invention is conducted as a batch or continuous type operation. In general, the various means customarily employed in extraction processes to increase the contact area between the catalyst and the feed may be used. The apparatus employed may be of a conventional nature and may comprise a single reactor such as a fluidized-bed reactor or multiple reactors equipped with efficient stirring devices such as mechanical agitators, jets of a restricted internal diameter, turbomixers, etc. The hydrocarbon-olefin phase and the catalyst phase may be passed through one or more reactors in concurrent, cross-current, or countercurrent flow. Unreacted reactants, catalysts, inhibitors and heavier products of the reaction may be separated from the desired alkylation product and from one another such as by distillation and returned in whole or in part to the alkylation zone.

In general, the alkylation reaction temperatures will vary in the range of from about −40 to 40° C., preferably −15 to 0° C. It is noted that lower temperatures may be used, for instance, to minimize competing side reactions such as polymerization. The reaction pressures employed may range from about 1 atmosphere to 50 atmospheres, preferably 1 to 20 atmospheres. While the hydrocarbon and olefinic reactants may be in either the liquid or gaseous phase, liquid phase operation is preferred. Normally gaseous olefins are generally dissolved in the hydrocarbon or in an appropriate solvent. The alkylation is preferably conducted in an inert atmosphere such as nitrogen, although it may be conducted in air.

The olefins and hydrocarbons are contacted in the presence of a catalyst for a time sufficient to effect the degree of alkylation desired. In general, the contact time is subject to wide variation. The length of the residence time depends in part upon the temperature, the olefin used and the catalyst concentration employed. By way of illustration, typical contact times for a liquid phase system will range from about 10 minutes to 60 minutes or more. In some instances shorter contact times may be desired.

BRIEF DESCRIPTION OF THE DRAWING

The drawing is a flow diagram of a preferred embodiment of the invention. In this connection the invention will be described with reference to the alkylation of isobutane with ethylene in the presence of an equimolar mixture of fluorosulfuric acid-antimony pentafluoride catalyst system.

Referring now to the drawing in detail, a paraffin feed comprising isobutane is introduced into alkylation zone 2 via line 1 from a source not shown. The olefinic feed comprising ethylene is introduced into alkylation zone 2 via line 21. It is noted that the olefin and paraffinic feeds may be premixed prior to introduction into the alkylation zone. The molar ratio of ethylene to isobutane is 1:5. The acid catalyst comprising a 1:1 molar mixture of fluorosulfuric acid and antimony pentafluoride is introduced into the alkylation zone 2 via line 3. The amount of catalyst added to the system is about 7 grams per gram of ethylene. The reaction temperature within the alkylation zone is maintained between the range of −15 and −5° C. The reaction pressure within said zone ranges between 1 and 10 atm., sufficient to maintain the reactants substantially in the liquid phase.

After a contact time of 0.5 to 3 hrs. (preferably 1 hr.) the alkylated product is discharged from the alkylation zone 2 by way of line 4 and sent to settling zone 5. Upon standing for a period of time, the product separates into a hydrocarbon phase and an inorganic phase containing residual acid catalyst. The acid catalyst is subsequently withdrawn from the zone, reactivated, if necessary, and then recycled to the alkylation zone 2 via line 6 for reuse. The hydrocarbon phase is withdrawn from settling zone 5 via line 7 and therein contacted with caustic (e.g. about 20% by weight sodium hydroxide), the caustic being introduced via line 8. The amount of caustic added is 10 grams per 100 grams of isobutane. The hydrocarbon-caustic mixture is then introduced into mixing zone 9 and subjected to intense agitation. After sufficient mixing time, the mixture is withdrawn from mixing zone 9 by way of line 10 and introduced into settling zone 11 wherein the caustic phase separates from the hydrocarbon phase.

The caustic phase is subsequently removed from settling zone 11 by way of line 12 and the hydrocarbon phase is removed from the settling zone by way of line 13 and introduced into separation zone 14 illustrated as a distillation zone that is provided with heating means such as steam coil 15 and with lines 16, 17, 18, 19 and 20. The conditions of temperature and pressure are adjusted in zone 14 to recover the alkylate product either in one fraction via line 16 or in several fractions by lines 17 and 18 while unreacted feed may be discharged by line 19 and preferably recycled to alkylation zone 2 via lines 19 and 1. The heavy side products are discharged from the separation zone 14 by line 20.

The invention will be further understood by reference to the following examples that include a preferred embodiment of the invention.

DESCRIPTION OF THE PREFERRED EMBODIMENT

Example 1

Several alkylation reactions were performed in a batchwise manner in a 200 cubic centimeter tetrafluoroethylene polymer (Teflon®)-lined reactor provided with a mechanical stirrer. The reactor was charged with 10 grams of a 1:1 molar mixture of the catalyst and 100 milliliters of the paraffin. With agitation, 0.2 mole of olefin was admitted in increments over a 30 minute period at a temperature of $-15$ to $-5°$ C. The reaction zone pressure was maintained between 1 and 20 atmospheres. After a 60 minute period, an aliquot of the hydrocarbon layer was removed and analyzed, the results of which are shown in Table I.

Product analysis

Tables and I and II summarize product compositions from the alkylation of n-butane and isobutane with ethylene, propylene, and butylenes, as determined by gas-liquid chromatography using a 150 foot, 0.01 inch I.D. squalene capillary column and a hydrogen ionization flame detector.

TABLE I.—ALKYLATIONS OF ALKANES WITH OLEFINS
[$CF_3SO_3H$—$SbF_5$ Catalyst]

| Feed | (1) Isobutane plus butane-1 | (2) n-Butane plus isobutylene | (3) Isobutane plus propylene |
|---|---|---|---|
| Catalyst | $CF_3SO_3H$—$SbF_5$ | $CF_3SO_3H$—$SbF_5$ | $CF_3SO_3H$—$SbF_5$ |
| Reaction time, hr | 1 | 1 | 1 |
| Reaction temp., °C | −10 | −10 | −10 |
| Reaction pressure (atm.-initial) | 5 | 1 | [1] 10 |
| Percent w./w. (catalyst/isobutane) | 20 | 20 | 20 |
| Product analysis, wt. percent: | | | |
| Butanes plus pentanes | 28 | 52 | |
| Pentanes | | | 25 |
| Hexanes | 5 | 9 | 9 |
| Heptanes | 4 | 7 | 48 |
| 2,4-dimethylpentane | | | 5 |
| 2,2,3-trimethylbutane | | | 1 |
| 2-methylhexane | | | 5 |
| 2,3-dimethylpentane | | | 86 |
| 3-methylhexane | | | 3 |
| Octanes | 37 | 27 | 10 |
| Trimethylpentanes | 26 | 19 | |
| Dimethylhexanes | 71 | 80 | |
| Methylheptanes | 3 | 1 | |
| Nonanes plus higher | 26 | 5 | |

[1] Approximate.

TABLE II.—ALKYLATIONS OF ALKANES WITH OLEFINS
[$FSO_3H$—$SbF_5$ Catalyst]

| Feed | (4) n-Butane plus butene-1 | (5) Isobutane plus ethylene | (6) n-Butane plus ethylene | (7) n-Butane plus propylene |
|---|---|---|---|---|
| Catalyst | $FSO_3H$—$SbF_5$ | $FSO_3H$—$SbF_5$ | $FSO_3H$—$SbF_5$ | $FSO_3H$—$SbF_5$ |
| Reaction time, hr | 1 | 1 | 1 | 1 |
| Reaction Temp., °C | −10 | −10 | −10 | −10 |
| Reaction pressure (atm.-initial) | 1 | [1] 20 | [1] 20 | [1] 10 |
| Percent w./w. (catalyst/isobutane) | 20 | 20 | 20 | 20 |
| Product analysis, wt. percent: | | | | |
| Butanes plus pentanes | 61 | 10 | 18 | |
| Pentanes | | | | 37 |
| Hexanes | 7 | 56 | 38 | 14 |
| 2,2-dimethylbutane | | 48 | 34 | |
| 2,3-dimethylbutane | | 11 | 16 | |
| 2-methylpentane | | 21 | 28 | |
| 3-methylpentane | | 12 | 16 | |
| n-hexane | | 8 | 6 | |
| Heptanes | 5 | | | 29 |
| 2,2-dimethylpentane | | | | 1.5 |
| 2,4-dimethylpentane | | | | 26 |
| 2,2,3-trimethylbutane | | | | 10 |
| 3,3-dimethylpentane | | | | 1 |
| 2-methylhexane | | | | 26 |
| 2,3-dimethylpentane | | | | 16 |
| 3-methylhexane | | | | 19 |
| Octanes | 22 | | | 11 |
| Trimethylpentanes | 14 | | | |
| Dimethylhexanes | 54 | | | |
| Methylheptanes | 32 | | | |
| Heptanes plus higher | | 34 | 44 | |
| Nonanes plus higher | 5 | | | 9 |

[1] Approximate.

It will be noted from the tables that alkylate of high $C_6^+$ content can be prepared by use of the catalysts of this invention. Moreover, the alkylation reactions can be performed at low temperatures vis-a-vis sulfuric acid alkylations, thus minimizing the importance of competitive side reactions such as polymerization. Furthermore, olefins such as ethylene that could not formerly be alkylated using sulfuric acid as the alkylation catalyst, are now amenable to low temperature alkylation without sacrificing alkylate quality.

What is claimed is:

1. A process for the alkylation of alkylatable hydrocarbons selected from the group consisting of paraffins, alkyl substituted aromatic hydrocarbons and mixtures thereof, with olefins at alkylation conditions comprising contacting said olefins and said alkylatable hydrocarbons with a catalyst comprising (a) a Lewis acid of the formula $MX_n$ where M is selected from the group consisting of Group IV–B, Group V and Group VI–B elements of the Periodic Table, X is a halogen and $n$ varies from 3–6, and (b) a Bronsted acid selected from the group consisting of fluorosulfuric acid and trifluoromethanesulfonic acid.

2. The process of claim 1 wherein the Lewis acid is selected from the group consisting of antimony pentafluoride, tantalum pentafluoride, niobium pentafluoride, vanadium pentafluoride, zirconium tetrafluoride, bismuth pentafluoride, phosphorus pentafluoride, titanium tetrafluoride, molybdenum hexafluoride and arsenic pentafluoride.

3. The process of claim 1 wherein said catalyst comprises antimony pentafluoride and fluorosulfuric acid.

4. The process of claim 1 wherein said paraffins are selected from the group consisting of $C_1$–$C_{15}$ straight and branched chain aliphatic and cycloaliphatic hydrocarbons and where said alkyl substituted aromatic hydrocarbons contain 7 to 20 carbon atoms per molecule.

5. The process of claim 1 wherein said olefins contain 2–12 carbon atoms per molecule.

6. The process of claim 1 wherein said catalyst comprises antimony pentafluoride and trifluoromethanesulfonic acid.

7. The process of claim 1 wherein said catalyst comprises tantalum pentafluoride and fluorosulfuric acid.

8. The process of claim 1 wherein said alkylation is conducted in the presence of a diluent inert to said catalyst under the reaction conditions.

9. The process of claim 8 wherein said diluent is selected from the group consisting of sulfuryl chloride fluoride, sulfuryl fluoride, and fluorinated hydrocarbons.

10. The process of claim 1 wherein said catalyst is supported on a solid carrier that is substantially inert to the supported acid.

11. The process of claim 10 wherein said carrier is a fluoride-treated resin.

12. The process of claim 10 wherein said carrier is a fluoride-treated acidic chalcite.

13. The process of claim 10 wherein said carrier is an acid-resistant molecular sieve.

14. An alkylation process comprising contacting $C_4$ to $C_8$ paraffins and $C_2$ to $C_5$ olefins in an alkylation zone with a catalyst comprising (a) a metal fluoride wherein the metal is selected from the group consisting of Group IV–B, Group V and Group VI–B metals of the Periodic Table and (b) a Bronsted acid selected from the group consisting of fluorosulfuric acid and trifluoromethanesulfonic acid, wherein said contacting takes place substantially in the liquid phase and at a temperature ranging between about $-40$ and $+40°$ C.

References Cited

UNITED STATES PATENTS

| | | | |
|---|---|---|---|
| 2,406,954 | 9/1946 | Linn | 260—683.47 |
| 3,192,283 | 6/1965 | Mosely et al. | 260—683.47 |
| 3,201,494 | 8/1965 | Oelderik et al. | 260—683.47 |
| 3,578,650 | 5/1971 | Mitchell, Jr. et al. | 260—671 C |
| 3,636,129 | 1/1972 | Parker et al. | 260—683.47 |

PAUL M. COUGHLAN, JR., Primary Examiner

G. J. CRASANAKIS, Assistant Examiner

U.S. Cl. X.R.

260—666 P, 671 C